(12) United States Patent
Yamamoto et al.

(10) Patent No.: US 8,883,318 B2
(45) Date of Patent: Nov. 11, 2014

(54) ALUMINUM BONDING ALLOY, AND CLAD MATERIAL AND ALUMINUM BONDING COMPOSITE MATERIAL EACH HAVING BONDING ALLOY LAYER MADE OF THE ALLOY

(75) Inventors: Shinji Yamamoto, Suita (JP); Masaaki Ishio, Suita (JP)

(73) Assignee: Neomax Materials Co., Ltd., Osaka (JP)

( * ) Notice: Subject to any disclaimer, the term of this patent is extended or adjusted under 35 U.S.C. 154(b) by 329 days.

(21) Appl. No.: 13/501,533

(22) PCT Filed: Oct. 25, 2010

(86) PCT No.: PCT/JP2010/068801
§ 371 (c)(1),
(2), (4) Date: Apr. 12, 2012

(87) PCT Pub. No.: WO2011/052517
PCT Pub. Date: May 5, 2011

(65) Prior Publication Data
US 2012/0202090 A1 Aug. 9, 2012

(30) Foreign Application Priority Data

Oct. 26, 2009 (JP) ................... 2009-245130

(51) Int. Cl.
B32B 15/20 (2006.01)
B32B 15/01 (2006.01)
(Continued)

(52) U.S. Cl.
CPC .............. B23K 1/19 (2013.01); B23K 20/023 (2013.01); B23K 20/16 (2013.01); B23K 20/2275 (2013.01); B23K 20/2333 (2013.01); B23K 20/2336 (2013.01); B23K 35/002 (2013.01); B23K 35/004 (2013.01); B23K 35/0233 (2013.01); B23K 35/3033 (2013.01); B32B 15/015 (2013.01); B32B 15/017 (2013.01); C22C 19/007 (2013.01); C22C 19/03 (2013.01); B23K 2201/40 (2013.01); B23K 2203/10 (2013.01); B23K 2203/18 (2013.01); B23K 2203/20 (2013.01)
USPC ............ 428/652; 428/660; 428/675; 428/679

(58) Field of Classification Search
None
See application file for complete search history.

(56) References Cited

U.S. PATENT DOCUMENTS 1,916,386 A  7/1933 Pilling
3,482,305 A * 12/1969 Dockus et al. ............... 228/194

(Continued)

FOREIGN PATENT DOCUMENTS

JP  2000-312979 A  11/2000
JP  2004-106059 A  4/2004

(Continued)

OTHER PUBLICATIONS

Official Communication issued in corresponding European Patent Application No. 10826649.5, mailed on Dec. 19, 2012.

(Continued)

Primary Examiner — John J Zimmerman
(74) Attorney, Agent, or Firm — Keating & Bennett, LLP

(57) ABSTRACT

An aluminum bonding alloy is an Ni—Mg alloy for bonding aluminum and a non-aluminum metal selected from steel, copper, nickel or titanium. The Ni—Mg alloy consists essentially of 0.08-0.90 mass % Mg, and the balance of Ni and inevitable impurities. A clad material includes a non-aluminum metal layer made of the non-aluminum metal and a bonding alloy layer made of the aluminum bonding alloy. The non-aluminum metal layer and the bonding alloy layer are bonded together by pressure welding and diffusion bonding.

8 Claims, 3 Drawing Sheets

(51) Int. Cl.
*B23K 1/19* (2006.01)
*B23K 20/02* (2006.01)
*B23K 20/16* (2006.01)
*B23K 20/227* (2006.01)
*B23K 20/233* (2006.01)
*B23K 35/00* (2006.01)
*B23K 35/02* (2006.01)
*B23K 35/30* (2006.01)
*C22C 19/00* (2006.01)
*C22C 19/03* (2006.01)

(56) References Cited

U.S. PATENT DOCUMENTS 3,533,781 A 10/1970 Tracey et al.
6,815,086 B2* 11/2004 Dockus et al. ............... 428/650
2002/0102431 A1 8/2002 Wittebrood et al.
2004/0035910 A1* 2/2004 Dockus et al. ............... 228/56.3
2008/0171217 A1 7/2008 Mishima

FOREIGN PATENT DOCUMENTS

| | | |
|---|---|---|
| JP | 2004-351460 A | 12/2004 |
| JP | 2008-166356 A | 7/2008 |
| JP | 2009-214119 A | 9/2009 |
| SU | 507903 * | 4/1976 |

OTHER PUBLICATIONS

Official Communication issued in International Patent Application No. PCT/JP2010/068801, mailed on Dec. 21, 2010.

Official Communication issued in corresponding European Patent Application No. 13003914.2, mailed on Sep. 9, 2013.

* cited by examiner

ALUMINUM BONDING ALLOY, AND CLAD MATERIAL AND ALUMINUM BONDING COMPOSITE MATERIAL EACH HAVING BONDING ALLOY LAYER MADE OF THE ALLOY

BACKGROUND OF THE INVENTION

1. Field of the Invention

The present invention relates to an aluminum bonding alloy excellent in pressure weldability, diffusion bondability and brazability not only to a non-aluminum metals such as steel, copper, nickel or titanium but also to aluminum, and a clad material and an aluminum bonding composite material each including a bonding alloy layer made of the bonding alloy.

2. Description of the Related Art

Aluminum is excellent in electric conductivity, workability and lightness, and therefore is used in many fields as a raw material of electrode materials, terminal materials, electrically conductive wire materials, etc. On the other hand, an aluminum material (a single-layer material) made of only aluminum is inferior in mechanical strength and corrosion resistance, and therefore a clad material is also often used that includes an aluminum layer made of aluminum and a non-aluminum metal layer made of stainless steel or nickel, with the layers being bonded together by pressure welding and diffusion bonding. Such a clad material is used as an electrically conductive material for a battery case, an electrode material, and a terminal material, etc.

Though the diffusion bondability of aluminum to nickel is relatively excellent, that of aluminum to stainless steel is less excellent than that of aluminum to nickel, and therefore a nickel layer, whose diffusion bondability is excellent to both of aluminum and stainless steel, may be provided between an aluminum layer and a stainless steel layer. For example, Japanese Laid-Open Patent Publication 2000-312979 and Japanese Laid-Open Patent Publication 2004-351460 each describe a clad material including an aluminum layer, a stainless steel layer, and a nickel layer provided between the aluminum layer and the stainless steel layer. Japanese Laid-Open Patent Publication 2004-106059 describes a clad material including an aluminum layer and a nickel layer directly pressure-welded and diffusion-bonded to the aluminum layer.

On the other hand, a power module which has a semiconductor device integrally provided with an aluminum cooler to cool down the semiconductor device has recently been used as an electronic part, and it is desired that its cooling performance is improved depending on increasing of its output. The power module has a structure including the aluminum cooler, a heat-diffusion facilitating layer (a heat spreader), a heat-conductive insulating substrate (referred to as a "DBA substrate") and the semiconductor device, wherein the aluminum cooler and the heat-diffusion facilitating layer are brazed together, and the heat-conductive insulating substrate and the semiconductor device are soldered on the heat-diffusion facilitating layer sequentially in this order, as described in, for example, Japanese Laid-Open Patent Publication 2008-166356. The heat-diffusion facilitating layer is usually formed from a clad material that is formed by bonding an aluminum layer to a copper layer excellent in heat conductivity to each other through an iron layer or a nickel layer by means of pressure welding and diffusion bonding.

The power module is usually assembled as follows. The aluminum cooler and the aluminum layer of the heat-diffusion facilitating layer are brazed together. Thereafter, the heat-conductive insulating substrate is soldered onto the copper layer of the heat-diffusion facilitating layer, and the semiconductor device is further soldered onto the heat-conductive insulating substrate. Otherwise, the heat-conductive insulating substrate having the semiconductor device soldered thereto in advance may be soldered to the heat-diffusion facilitating layer. The heat-conductive insulating substrate has a structure formed by laminating aluminum layers on both sides of a ceramic layer of aluminum nitride, etc., and the both surfaces of the heat-conductive insulating substrate are usually nickel-plated to secure the solder wettability of the surfaces.

As described above, aluminum and nickel are each excellent in bondability, and therefore, generally, an aluminum layer and a nickel layer are directly bonded together, and a stainless layer is bonded to an aluminum layer through a nickel layer. When aluminum and copper are diffusion-bonded together, a highly fragile intermetallic compound is produced therebetween, and then aluminum and copper are unable to be directly bonded, but an aluminum layer and a copper layer are able to be bonded to each other by providing an iron layer or a nickel layer between the aluminum layer and the copper layer.

However, though an aluminum layer and a nickel layer, or an aluminum layer and an iron layer, are able to be bonded together by pressure welding and diffusion bonding, an Al—Ni-based or an Al—Fe-based intermetallic compound is produced due to a diffusion reaction between the aluminum layer and the nickel layer, or the aluminum layer and the iron layer. When these intermetallic compounds excessively grow, the bondability is significantly degraded. Hence, the diffusion-annealing condition for the diffusion bonding after the pressure welding usually needs to appropriately be controlled so that the intermetallic compound layer does not excessively grow.

As above, the aluminum cooler is brazed to the aluminum layer of the heat-diffusion facilitating layer included in the power module with an aluminum brazing material for bonding aluminum such as an Al—Si-based brazing material at about 600° C. During this brazing, the intermetallic compound layer that is produced during the diffusion bonding between the aluminum layer of the heat-diffusion facilitating layer and the nickel layer, or the aluminum layer and the iron layer, grows. Accordingly, the problem arises of impairing the bonding strength which is present before the brazing between the aluminum layer and the nickel layer in the heat-diffusion facilitating layer, or the aluminum layer and the iron layer due to the brazing.

Improvements are recently demanded of the fuel efficiency of cars, trucks, etc., from a viewpoint of an environmental measure. Accordingly, in order to reduce the weight of structural members of a car, etc., it has been considered to replace a steel material of which some of the structural members are made with an aluminum material, and this replacement is actually conducted. However, it is difficult to bond the steel material and the aluminum material together by welding or brazing, and under current circumstances, these materials are mainly coupled with a mechanical coupling means such as rivets, and bolts and nuts. Hence, it is necessary to decrease the degree of freedom in the designing and reduction of the productivity for an aluminum coupling composite material manufactured by coupling the steel material and the aluminum material together.

SUMMARY OF THE INVENTION

In view of the above circumstances, preferred embodiments of the present invention provide an aluminum bonding alloy excellent in pressure weldability, diffusion bondability and brazability not only to non-aluminum metals such as steel, copper, nickel and titanium but also to aluminum. Preferred embodiments of the present invention also provide a clad material and an aluminum bonding composite material each including a bonding alloy layer made of the bonding alloy.

In view of the above problems that various preferred embodiments of the present invention are intended to solve, the inventors have researched and studied alloy components to be added to a base metal of nickel that is able to contribute excellent diffusion bondability and brazability to aluminum. The reason why nickel is preferably used as a base metal is that nickel is generally excellent in a pressure-welding property, a diffusion-bonding property, a brazing property, and a welding property to non-aluminum metals such as steel, copper, and titanium. As a result, the inventors have discovered that an Ni—Mg alloy including a predetermined amount of magnesium, which does not substantially solid-solve in nickel, shows an excellent bonding property not only to the non-aluminum metals but also to aluminum. Preferred embodiments of the present invention were conceived and developed based on the above discovery.

An aluminum bonding alloy according to a preferred embodiment of the present invention is an Ni—Mg alloy for bonding aluminum and any one non-aluminum metal selected from steel, copper, nickel and titanium. The Ni—Mg alloy essentially includes 0.08 mass % or more and 0.90 mass % or less, preferably 0.10 mass % or more and 0.70 mass % or less of Mg (hereinafter, "mass o" will simply be referred as "%"), and, as the balance, Ni and inevitable impurities. In the present invention, "aluminum" means, in addition to pure aluminum, Al-alloys each including Al as its main component. "Steel" means, in addition to pure iron, Fe-alloys each including Fe as its main component such as, for example, mild steel, alloy steel, and stainless steel. Similarly, "copper" means, in addition to pure copper, Cu-alloys each including Cu as its main component. "Nickel" means, in addition to pure nickel, Ni-alloys each including Ni as its main component. "Titanium" means, in addition to pure titanium, Ti-alloys each including Ti as its main component. The "main component" means a component that accounts for 50% or more of the material.

The aluminum bonding alloy has a matrix including high-concentration Ni and then is excellent in pressure weldability, diffusion bondability, brazability and weldability to any one non-aluminum metal of steel, copper, nickel and titanium. The aluminum bonding alloy is also excellent in pressure weldability, diffusion bondability and brazability to aluminum. The reason will be described more in detail as follows.

When a nickel layer and an aluminum layer are pressure-welded and diffusion-bonded together, an Ni—Al-based intermetallic compound layer is produced therebetween. When the annealing temperature is decreased and thereby the diffusion reaction is suppressed so as not to increase a layer thickness of the intermetallic compound layer during the diffusion annealing for the diffusion bonding, the intermetallic compound layer exerts relatively excellent bonding strength. However, according to the observation by the inventors, when the intermetallic compound layer grows up to about 10 μm in thickness due to an active diffusion reaction, the bonding strength between the aluminum layer and the intermetallic compound layer is degraded, and the aluminum layer tends to peel off from the interface of the intermetallic compound layer. For pursuing the cause of the above, the interface between the aluminum layer and the intermetallic compound layer was observed in detail by EPMA, and, as a result, it was recognized that aluminum oxide was finely dispersed in the vicinity of the bonding interface of the aluminum layer. It was estimated that the aluminum oxide was formed in a manner such that an aluminum oxide which had been inevitably generated by natural oxidation on the surface of the aluminum raw material to be formed into the aluminum layer was pushed away and moved to the interface of the aluminum layer and its vicinity during the diffusion reaction.

On the other hand, where the bonding alloy layer made of the aluminum bonding alloy according to a preferred embodiment of the present invention and an aluminum layer are bonded together by pressure welding and diffusion bonding, even when the intermetallic compound layer is thickly formed up to about 10 μm due to the active diffusion reaction, the bonding strength between the bonding alloy layer and the aluminum layer is not degraded. The cause is considered as below: when the intermetallic compound layer is formed due to the diffusion reaction, in the process with the aluminum oxide present on the surface of the aluminum layer being pushed away to the bonding interface between the aluminum layer and the intermetallic compound layer, the aluminum oxide is reduced by a proper amount of Mg present in the nickel matrix of the Ni—Mg alloy that makes the bonding alloy layer, and after the diffusion reaction, the amount of aluminum oxide present in the interface of the aluminum layer is decreased.

When aluminum is brazed to the aluminum bonding alloy according to a preferred embodiment of the present invention with an aluminum brazing material, a proper amount of Mg in the bonding alloy also reduces aluminum oxide present in a brazed layer that is formed during the brazing, and hence the bonding alloy and the brazed layer are rigidly bonded together. Therefore, the aluminum bonding alloy according to a preferred embodiment of the present invention exerts an excellent brazing property not only to non-aluminum metals but also to aluminum.

As stated above, the aluminum bonding alloy according to a preferred embodiment of the present invention achieves excellent pressure weldability, bondability and brazability not only to non-aluminum metals but also to aluminum. Therefore, the bonding alloy layer made of the bonding alloy is able to be suitably used in the following various clad materials and aluminum bonding composite materials.

A clad material of a first aspect according to a preferred embodiment of the present invention includes a non-aluminum metal layer made of any one non-aluminum metal selected from steel, copper, nickel and titanium, and a bonding alloy layer made of the aluminum bonding alloy, wherein the non-aluminum metal layer and the bonding alloy layer are bonded together by pressure welding and diffusion bonding.

According to the clad material, an aluminum material can be rigidly brazed to the bonding alloy layer. The brazing of the aluminum material is executed at about 600° C., but the bonding strength between the non-aluminum metal layer and the bonding alloy layer of the clad material is not degraded at such a temperature. Hence, an aluminum bonding composite material is able to be easily provided that has the aluminum material rigidly brazed to the non-aluminum metal layer through the bonding alloy layer of the clad material.

In the clad material of the first aspect, a brazing material layer made of an aluminum brazing material for bonding aluminum may be integrally bonded to the bonding alloy layer. Thereby, no brazing material needs to separately be prepared, and the brazing workability is improved. The brazing material layer is bonded to the bonding alloy layer by pressure welding, or pressure welding and diffusion bonding, and so on. Since the brazing material layer melts during the brazing, it may be bonded to the extent that the brazing material layer does not separate off from the bonding alloy layer during the handling thereof. Accordingly, the brazing material layer and the bonding alloy layer do not need to be rigidly bonded together.

As mentioned above, the aluminum bonding composite material can be easily produced by brazing the aluminum material to the bonding alloy layer of the clad material of the first aspect. In the aluminum bonding composite material, the non-aluminum metal layer of the clad material may be made of copper, and an aluminum cooler to cool a semiconductor device may be used as the aluminum material. Thereby, a cooling member excellent in durability, which is used in an electronic part such as a power module, is able to be provided.

A clad material of a second aspect according to a preferred embodiment of the present invention includes a non-aluminum metal layer, a bonding alloy layer, and an aluminum layer made of aluminum, wherein the non-aluminum metal layer and the bonding alloy layer, and the bonding alloy layer and the aluminum layer are individually bonded together by pressure welding and diffusion bonding. As to the clad material of the second aspect, a brazing material layer made of the aluminum brazing material may be bonded to the aluminum layer of the clad material. Thereby, the brazing workability is improved. The brazing material layer is bonded to the aluminum layer by pressure welding, or pressure welding and diffusion bonding.

According to the clad material of the second aspect, the aluminum material can be more rigidly brazed to the aluminum layer than the case where the aluminum material is directly brazed to the bonding alloy layer. Hence, an aluminum bonding composite material having the aluminum material more rigidly brazed thereto is able to be easily provided.

As stated above, the aluminum bonding composite material can be easily produced by brazing the aluminum material to the aluminum layer of the clad material of the second aspect. In the aluminum bonding composite material, the non-aluminum metal layer of the clad material may be made of copper, and an aluminum cooler to cool a semiconductor device may be used as the aluminum material. Thereby, a cooling member having the aluminum cooler more rigidly bonded together, of an electronic part such as a power module and the like is able to be provided.

In the clad material of the second aspect, the non-aluminum metal layer may be made of stainless steel, and the aluminum layer may be made of pure Al or an electrically conductive aluminum alloy including 90 mass % or more of Al. Thereby, the clad material can simultaneously have not only an electronic conductivity based on the aluminum layer but also a mechanical strength, a corrosion resistance, a bondability to electrically conductive wire materials and an economical efficiency based on the non-aluminum metal layer (the stainless steel layer). The clad material including the stainless steel layer as the non-aluminum metal layer is able to be suitably used as an electrically conductive raw material for a battery case, a terminal member, or the like.

A clad material of a third aspect according to a preferred embodiment of the present invention includes an aluminum layer made of aluminum, and a bonding alloy layer made of the aluminum bonding alloy of the present invention, wherein the aluminum layer and the bonding alloy layer are bonded together by pressure welding and diffusion bonding.

According to the clad material, a non-aluminum metal material made of any one non-aluminum metal selected from steel, copper, nickel and titanium is easily bonded by using a bonding method such as brazing or welding to the bonding alloy layer to which the aluminum layer is rigidly bonded. Hence, an aluminum bonding composite body including the non-aluminum metal material bonded to the bonding alloy layer of the clad material is able to be easily provided. The bonding alloy layer of the clad material of the third aspect has a high Ni concentration and is also excellent in workability, corrosion resistance, and brazability and weldability to electrically conductive wire materials. Hence, the clad material itself is able to be suitably used as an electrically conductive raw material of a battery case, a terminal member, or the like.

A clad material of a fourth aspect according to a preferred embodiment of the present invention includes a bonding alloy layer made of the aluminum bonding alloy of a preferred embodiment of the present invention, and a brazing material layer made of an aluminum brazing material for bonding aluminum or a non-aluminum metal brazing material for bonding any one non-aluminum metal selected from steel, copper, nickel and titanium by brazing, wherein the bonding alloy layer and the brazing material layer are bonded together.

According to the clad material, an aluminum material and the bonding alloy layer, or a non-aluminum metal material and the bonding alloy layer are able to be rigidly brazed together with the brazing material layer without separately preparing any brazing material. The brazing material layer bonded to the bonding alloy layer by pressure welding, or pressure welding and diffusion bonding.

The aluminum bonding alloy according to a preferred embodiment of the present invention essentially includes 0.08 mass % to 0.90 mass % of Mg, and the balance of Ni and inevitable impurities, and accordingly, a non-aluminum metal selected from steel, copper, nickel or titanium is rigidly bonded to the aluminum bonding alloy. As for a bonding to aluminum, since aluminum oxide present in the bonding interface of the aluminum is reduced by a proper amount of Mg in the aluminum bonding alloy during the bonding, aluminum is rigidly bonded to the aluminum bonding alloy by using a bonding method such as a diffusion bonding, brazing and welding. As described above, since the aluminum bonding alloy of the present invention can rigidly bond not only to the aluminum material but also to the non-aluminum metal material, the aluminum bonding alloy is well suited to a bonding material for both kinds of materials. The aluminum bonding alloy is itself excellent in corrosion resistance, workability and bondability, and hence various types of clad materials and aluminum bonding composite materials each including the bonding alloy layer made of the aluminum bonding alloy are able to be easily provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An aluminum bonding alloy according to a preferred embodiment of the present invention will be described first. The aluminum bonding alloy is made of an Ni—Mg-alloy that includes essentially 0.08 mass % or more and 0.90 mass % or less (0.08 mass % to 0.90 mass %) of Mg, and, as the balance, Ni and inevitable impurities. The reason why Ni is preferably used as an alloy base is that Ni has an excellent ductility and workability, also has a relatively high strength and corrosion resistance, and is excellent in pressure weldability, diffusion bondability, brazability and weldability. On the other hand, Mg is an important element in the alloy according to a preferred embodiment of the present invention, because, in diffusion-bonding and brazing of the alloy to aluminum, Mg reduces aluminum oxide that is present on the aluminum interface and thereby improves the bondability for aluminum.

The reason will be described for limiting the Mg component in the Ni—Mg-alloy. When the amount of Mg exceeds 0.90%, the hot-working property and the cold-working property of the alloy are degraded, and accordingly, it is difficult to roll the Ni—Mg-alloy into the form of a plate, etc. On the other hand, when the amount of Mg is less than 0.08%, the action of reducing aluminum oxide by Mg becomes excessively low, and the improvement of the bonding property of the alloy is degraded. Hence, in a preferred embodiment of the present invention, the lower limit of the amount of Mg is preferably set to be 0.08%, preferably 0.10%, and more preferably 0.20%, and the upper limit thereof is preferably set to be 0.90%, preferably 0.70%, and more preferably 0.65%. The Ni—Mg-alloy typically includes the above predetermined amount of Mg and, as the balance, Ni and inevitable impurities. However, in addition to Mg, elements to reduce aluminum oxide such as Ca, Li, or an REM (rare earth metal) may be added to the Ni—Mg-alloy in a minute amount alone or in combination with other such elements to the extent that the workability of the Ni—Mg-alloy is not degraded.

The aluminum bonding alloy is usually manufactured by the following process steps. A raw material whose contents are properly adjusted is melted and cast into an ingot. The ingot is hot-worked. When necessary, the worked piece is submitted to intermediate annealing. Thereafter, the worked piece is cold-worked into a desired form that is typically a plate. Though Mg does not substantially solid-solve in Ni, Mg disperses finely and precipitates in the Ni matrix of the ingot without any special cooling method such as rapid solidification.

Various clad materials each including a bonding alloy layer made of the aluminum bonding alloy, and aluminum bonding composite materials each produced by using one of the clad materials will be described with reference to the accompanying drawings.

Figure 1:
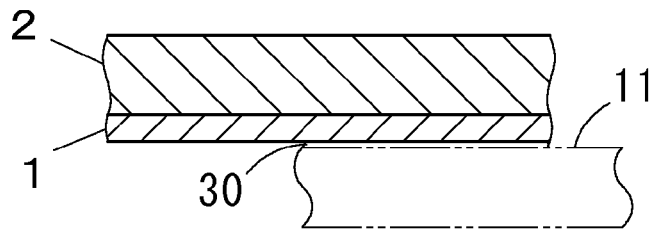
FIG. 1 is a schematic cross-sectional diagram of a major portion of a clad material according to a first preferred embodiment of the present invention.

FIG. 1 shows a clad material according to a first preferred embodiment of the present invention. The clad material includes a non-aluminum metal layer 2 made of a non-aluminum metal selected from steel, copper, nickel or titanium, and a bonding alloy layer 1 made of the aluminum bonding alloy, wherein the non-aluminum metal layer 2 and the bonding alloy layer 1 are bonded together by pressure welding and diffusion bonding. The "pressure welding and diffusion bonding" includes the case not only where a pressure welding and thereafter a diffusion bonding are executed but also where a pressure welding and a diffusion bonding are simultaneously executed. Using the diffusion bonding in addition to the pressure welding makes rigid bonding.

Exemplified as a material of the steel is a low carbon steel such as pure iron or mild steel, or a stainless steel. Exemplified as a material of the copper is pure copper, a copper-zinc-alloy, a copper-nickel-alloy, or German silver. Exemplified as a material of the nickel is pure nickel, or a Ni—Cu alloy such as Monel metal. Exemplified as a material of the titanium is pure titanium, a β-titanium alloy, or an α+β-titanium alloy. A suitable metal is selected as the non-aluminum metal according to the required properties, its use applications, etc.

According to the clad material of the first preferred embodiment, an aluminum material is easily brazed to the bonding alloy layer 1 with an aluminum brazing material for bonding aluminum. As a result, an aluminum bonding composite material is easily produced that has the non-aluminum metal layer 2 and the aluminum material 11 rigidly bonded to each other through the bonding alloy layer 1. Exemplified as a material of the aluminum brazing material is an Al—Si—Mg-based brazing material such as "4004" under the JIS standard, or an Al—Si-based brazing material such as "4343" under the same standard. A brazing layer 30 is formed between the bonding alloy layer 1 and the aluminum material 11, which has a composition produced by mixing components of the melted brazing material and components moved from the bonding alloy layer 1 and others during the brazing.

Figure 2:
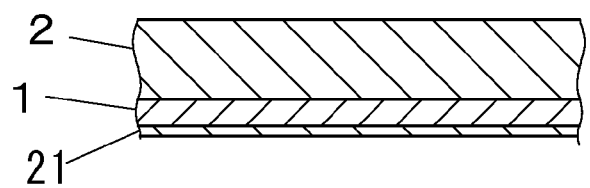
FIG. 2 is a schematic cross-sectional diagram of a clad material that is a varied form of the clad material of the first preferred embodiment and that includes a brazing material layer.

FIG. 2 shows a clad material of a varied form of the first preferred embodiment. The clad material has a brazing material layer 21 made of the aluminum brazing material bonded to the other surface, to which the aluminum material 11 is to be brazed, of the bonding alloy layer 1 of the clad material of the first preferred embodiment by pressure welding and diffusion bonding. That is to say, it is a three-layer clad material formed by bonding together the non-aluminum metal layer 2, the bonding alloy layer 1, and the brazing material layer 21. The three-layer clad material including the brazing material layer 21 does not need any brazing material to be separately prepared for brazing an aluminum material, and then the brazing workability is improved. About 50 μm to about 500 μm, for example, is sufficient for the thickness of the brazing material layer. Since the brazing material layer 21 melts during the brazing, the brazing material layer may be bonded to the extent that the brazing material layer 21 does not separate off during the handling thereof. Accordingly, the brazing material layer 21 has only to be pressure-welded to the bonding alloy layer 1, and then the diffusion bonding may be omitted.

Figure 3:
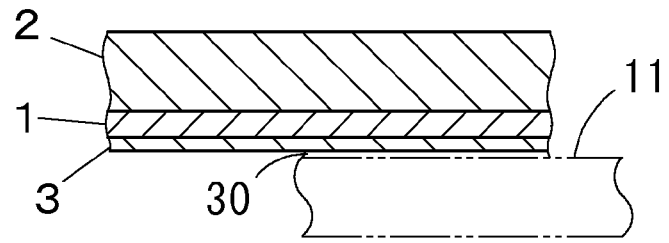
FIG. 3 is a schematic cross-sectional diagram of a major portion of the clad material according to a second preferred embodiment of the present invention.

FIG. 3 shows a clad material according to a second preferred embodiment of the present invention. The clad material includes a non-aluminum metal layer 2 made of the non-aluminum metal, a bonding alloy layer 1 made of the aluminum bonding alloy, and an aluminum layer 3 made of aluminum, wherein the non-aluminum metal layer 2 and the bonding alloy layer 1, and the bonding alloy layer 1 and the aluminum layer 3 are each integrally bonded together by pressure welding and diffusion bonding.

According to the clad material, since an aluminum material can be more rigidly brazed to the aluminum layer 3 bonded to the bonding alloy layer 1, an aluminum bonding composite material is able to be easily produced that has the non-aluminum metal layer 2 and the aluminum material 11 more rigidly bonded to each other through the bonding alloy layer 1 and the aluminum layer 3.

In the clad materials of the first and the second preferred embodiments, an electrically conductive aluminum bonding composite material excellent in heat conductivity is able to be easily produced by making the non-aluminum metal layer 2 of a copper excellent in heat conductivity and by brazing the aluminum material 11 to the bonding alloy layer 1 or the aluminum layer 3. Exemplified as a material of the copper excellent in heat conductivity is pure copper such as tough pitch copper or oxygen-free copper, or a copper alloy including 85% or more, more preferably 90% or more of Cu such as phosphor bronze, a copper-chromium alloy, a copper-beryllium alloy, aluminum bronze, or a gun metal.

Figure 4:
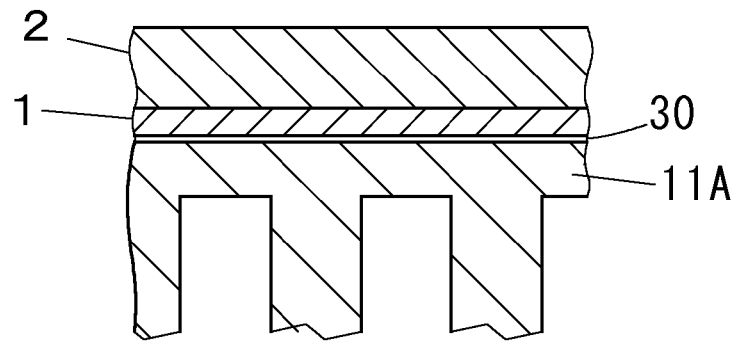
FIG. 4 is a schematic cross-sectional diagram of a major portion of an aluminum bonding composite material assembled by brazing an aluminum cooler as an aluminum material to the clad material according to the first preferred embodiment of the present invention.

FIG. 4 shows a cooling member of an electronic part such as a power module or the like as the electrically conductive aluminum bonding composite material. The cooling member is formed by brazing an aluminum cooler 11A including fins as the aluminum material 11 to the bonding alloy layer 1 of the clad material of the first preferred embodiment. The non-aluminum metal layer (a copper layer) 2 of the clad material plays a role of a heat spreader that quickly transmits to the cooler 11A the heat transmitted from the heat-conductive insulating substrate (DBA substrate) laminated to the non-aluminum metal layer.

The electrically conductive aluminum bonding composite material may be manufactured by using not only the clad material of the first preferred embodiment but also the clad material of the second preferred embodiment shown in FIG. 3. When the clad material of the second preferred embodiment is used, the aluminum cooler 11A is brazed to the aluminum layer 3. When the electrically conductive aluminum bonding composite material is used as the cooling member of the power module, it is preferable that, each in thickness, the non-aluminum metal layer (the copper layer) 2 is about 0.5 mm to about 3 mm, the bonding alloy layer 1 is about 50 μm to about 200 μm, and the aluminum layer 3 is about 10 μm to about 100 μm, for example.

When the electrically conductive aluminum bonding composite material is used as the cooling member, the bonding alloy layer made of the aluminum bonding alloy according to a preferred embodiment of the present invention may be provided on the other surface of the non-aluminum alloy layer (the copper layer) 2. Since both surfaces of the heat-conductive insulating substrate (DBA substrate) are generally nickel-plated, the surfaces are easily soldered to a copper layer. However, some heat-conductive insulating substrates are not nickel-plated and then expose their aluminum layers. In this case, providing in advance a bonding alloy layer on the other surface of the copper layer can make the aluminum layer of the heat-conductive insulating substrate braze rigidly to the bonding alloy.

In the clad material of the second preferred embodiment, the aluminum layer 3 may be made of an aluminum excellent in electric conductivity, and the non-aluminum metal layer 2 may be made of a metal that is excellent in corrosion resistance, workability and bondability and higher in strength than aluminum such as a stainless steel, pure nickel, or a nickel alloy having a Ni content of 90% or more. Such a clad material is able to be suitably used as a raw material for a battery case and a connecting terminal. For these use applications, it is preferable that, each in thickness, the aluminum layer 3 is about 10 μm to about 100 μm, the bonding alloy layer 1 is about 50 μm to about 200 μm, and the non-aluminum metal layer 2 is about 200 μm to about 500 μm, for example.

Cited as a preferable material of the aluminum excellent in electric conductivity is pure aluminum (for example, 1000-series aluminum such as "1060", "1080", etc., under the JIS standard) or an aluminum alloy having an Al content of 85% or more, preferably 90% or more. Cited as such an aluminum alloy is, each under the JIS standard, a 3000-series aluminum alloy (an Al—Mn-based alloy) such as "A3003" or "A3004", a 4000-series aluminum alloy (an Al—Si-based alloy) such as "A4042", or a 5000-series aluminum alloy (an Al—Mg-based alloy) such as "A5005" or "A5052", for example. Cited as a material of the stainless steel is, for example, an austenitic stainless steel such as "SUS303", "SUS304" or "SUS316," or a ferritic stainless steel such as "SUS405" or "SUS430" under the JIS standard.

Figure 5:
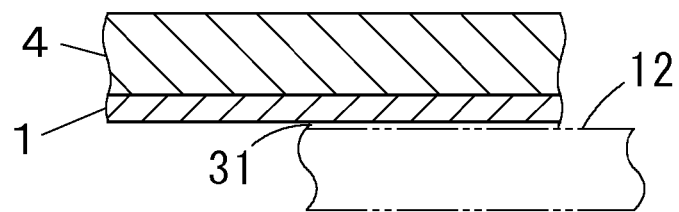
FIG. 5 is a schematic cross-sectional diagram of a major portion of a clad material according to a third preferred embodiment of the present invention.

FIG. 5 shows a clad material according to a third preferred embodiment of the present invention. The clad material includes an aluminum layer 4 made of aluminum and a bonding alloy layer 1 made of the aluminum bonding alloy, wherein the aluminum layer 4 and the bonding alloy layer 1 are bonded together by pressure welding and diffusion bonding. A non-aluminum metal material 12 made of a suitable material selected according to the intended purpose and the use application is bonded to the bonding alloy layer 1 by brazing or welding, and then an aluminum bonding composite material can be easily produced. Since the bonding alloy layer 1 of the clad material has a high Ni concentration and is excellent in workability, corrosion resistance, brazability and weldability, the clad material itself is able to be suitably used as a raw material for a battery case, a terminal member, etc. For these use applications, it is preferable that the aluminum layer 4 is made of the aluminum alloy excellent in electric conductivity, and, each in thickness, the aluminum layer 4 is about 10 μm to about 100 μm and the bonding alloy layer 1 is about 50 μm to about 200 μm, for example.

In the clad material of the third preferred embodiment, similarly to the clad material shown in FIG. 2, a brazing material layer may be bonded to the other surface (the surface of a side to be brazed) of the bonding alloy layer 1 by pressure welding or by pressure welding and diffusion bonding, and thereby, a clad material is able to be acquired that has the three layers with the aluminum layer 4, the bonding alloy layer 1, and the brazing material layer integrated. By providing the brazing material layer, no brazing material needs to separately be prepared, and the brazing workability is improved.

When the non-aluminum metal material 12 is brazed to the bonding alloy layer 1 of the clad material according to the third preferred embodiment, the brazing material is used that has a brazing temperature at which the aluminum layer 4 does not melt. The brazing temperature is preferably lower than the melting point (for example, 660° C. for pure aluminum) of the aluminum forming the aluminum layer 4 and is more preferably at a temperature lower than the melting point by about 60° C. When the non-aluminum metal material 12 is welded to the bonding alloy layer 1, local-heating-type welding is preferable such as spot welding or laser beam welding. In such welding, even when the temperature locally exceeds the melting point of the aluminum that forms the aluminum layer 4, the whole aluminum layer 4 does not melt, and then the bonding property between the aluminum layer 4 and the bonding alloy layer 1 is secured.

Figure 6:
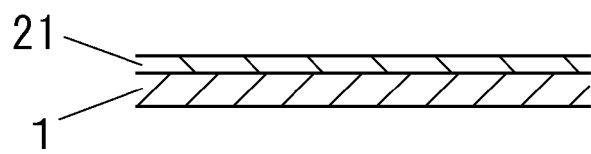
FIG. 6 is a schematic cross-sectional diagram of a major portion of a clad material according to a fourth preferred embodiment of the present invention.

FIG. 6 shows a clad material according to a fourth preferred embodiment of the present invention. The clad material includes a bonding alloy layer 1 made of the aluminum bonding alloy according to a preferred embodiment of the present invention and a brazing material layer 21, wherein the bonding alloy layer 1 and the brazing material layer 21 are bonded together by pressure welding or by pressure welding and diffusion bonding. In the clad material, the brazing material layer 21 does not need to be rigidly bonded to the bonding alloy layer 1, and then, diffusion bonding may be omitted.

The brazing material layer 21 is made of an aluminum brazing material for bonding aluminum, or a non-aluminum metal brazing material for bonding any one non-aluminum metal selected from steel, copper, nickel and titanium by brazing. Silver solder made of an Ag—Cu-based alloy is mainly used as the non-aluminum metal brazing material. Exemplified as a material of the silver solder is a BAg-based silver solder such as "BAg-1", "BAg-4", or "BAg-8" under the JIS standard.

According to the clad material of the fourth preferred embodiment, the bonding alloy layer 1, and an aluminum material or a non-aluminum metal material are rigidly brazed together with the brazing material layer 21 without separately preparing any brazing material. In addition, a non-aluminum metal material or an aluminum material is easily bonded by brazing or welding to the other surface of the bonding alloy layer 1, which is not bonded to the brazing material layer 21. Thereby, an aluminum bonding composite material is able to be easily produced that has the aluminum material and the non-aluminum metal material bonded to each other through the bonding alloy layer 1.

When the brazing material layer 21 is made of an aluminum brazing material, the aluminum material is brazed to the bonding alloy layer 1 with the brazing material of the brazing material layer 21 and, thereafter, the non-aluminum metal material is bonded to the other surface of the bonding alloy layer 1 by brazing or welding. When the non-aluminum metal material is brazed, a non-aluminum brazing material is used that has the brazing temperature lower than the melting point of the aluminum alloy in the brazed portion formed during the brazing executed by using the brazing material layer. When the non-aluminum metal material is welded, local-heating-type welding is preferably used.

On the other hand, when the brazing material layer 21 is made of a non-aluminum metal brazing material, the non-aluminum metal material is brazed to the bonding alloy layer 1 with the brazing material of the brazing material layer 21 and, thereafter, the aluminum material is rigidly brazed to the other surface of the bonding alloy layer 1 with an aluminum brazing material. The melting point of the non-aluminum metal brazing material (mainly made of silver solder) is usually higher than that of the aluminum brazing material (mainly made of Al—Si-based brazing material). Accordingly, when the aluminum material is brazed, the brazed portion of the non-aluminum metal material does not melt. Hence, any brazing material is able to be used as the non-aluminum metal brazing material as far as the bonding alloy layer 1 does not melt during the brazing.

Each of the clad materials of the preferred embodiments described above is integrally manufactured in the following manner. Metal materials in a thin-plate form, a sheet form, or a film form are stacked on each other that are the raw materials corresponding to the layers of the clad material. The stacked material is pressure-welded to each other under pressure by cold rolling, and thereafter, the pressure-welded material is submitted to diffusion annealing for the adjacent layers of the pressure-welded material to be diffusion-bonded to each other. The stacked material may be diffusion-annealed under pressure welding to be pressure-welded and diffusion-bonded at the same time. The temperature for the diffusion annealing is set to be in a temperature range within which any layer of the clad material does not melt. In the cold rolling, intermediate annealing may be executed, when necessary. In addition, the clad may be cold-rolled to adjust the plate thickness after the diffusion annealing.

As to the clad material of the varied form of the first preferred embodiment shown in FIG. 2, the bonding alloy layer 1 and the brazing material layer 21 may be pressure-welded together by stacking a brazing material in a thin-plate form, a sheet form, or a film form on the bonding alloy layer 1 of the clad material of the first preferred embodiment manufactured in advance and by pressing the stacked material. The brazing material layer 21 may be only bonded by pressure welding, but, when necessary, the pressure-welded material may be submitted to diffusion annealing for the bonding alloy layer 1 and the brazing material layer 21 to be diffusion-bonded. As to the clad material of the second preferred embodiment shown in FIG. 3, the aluminum layer 3 may be bonded to the bonding alloy layer 1 of the clad material of the first preferred embodiment by pressure welding and diffusion annealing.

When an aluminum layer is diffusion-bonded to a nickel layer or a stainless steel layer, the temperature of the diffusion annealing is conventionally set to be about 300° C. to about 550° C., for example. However, as in the second and the third preferred embodiments, when the aluminum layers 3 and 4 are each diffusion-bonded to the bonding alloy layer 1, the diffusion-bonding temperature can be increased up to a temperature lower by about 20° C. than the melting point of the aluminum that forms each of the aluminum layers. For example, when the aluminum layers are each made of pure aluminum, the temperature may be set to be about 600° C. corresponding to the brazing temperature of the pure aluminum or about 640° C. higher, for example.

The present invention will more specifically be described with reference to the following examples. However, the present invention should not be interpreted as being limited by the examples.

Example 1

(1) Manufacture of Aluminum Boding Alloy

Pure Ni (Mg=0%) and Ni—Mg-alloys with various amounts of Mg were melted to produce ingots as shown in Table 1. Each ingot (32 mm in thickness) was hot-rolled at 1000° C. for a hot-rolled plate (8 mm in thickness). The hot-rolled plate was cold-rolled (through five passes) into a cold-rolled plate (2 mm in thickness and 30 mm in width). During the rolling, the processing state of the plate was observed, and the result is shown in Table 1. In Table 1, the following symbols each indicate evaluation of the workability: "xx" indicates the case where the rolled plate was broken in the stage of the hot rolling, "x" indicates the case where the rolled plate was substantially broken in the stage of the cold rolling, "Δ" indicates the case where minute cracks each equal to or smaller than about 5 mm were generated in the side edge portions of the rolled plate in the stage of the cold rolling, and "○" indicates the case where no crack was generated in the rolled plate in the stage of the cold rolling. A tensile test piece of No. 13B under the JIS standard was collected from each of the cold-rolled plates, and a tension test was conducted on the tensile test piece to measure the tensile strength and the elongation. The result of the tension test is also shown in Table 1. In Table 1, symbol "−" indicates that no measurement was executed. From Table 1, it can be seen that the alloys Nos. 9 and 10 whose amounts of Mg each equal to or higher than 1.1% were significantly inferior in workability and are not suitable as a material for a clad.

TABLE 1

| Alloy No. | Alloy composition % | Workability | Tensile strength N/mm$^2$ | Elongation % | Remarks |
|---|---|---|---|---|---|
| 1 | Pure Ni | ○ | 358.7 | 33.6 | Comparative alloy |
| 2 | Ni—0.021Mg | ○ | 364.6 | 34.1 | Comparative alloy |
| 3 | Ni—0.055Mg | ○ | 374.4 | 35.0 | Comparative alloy |
| 4 | Ni—0.10Mg | ○ | 390.0 | 32.3 | Inventive alloy |
| 5 | Ni—0.26Mg | ○ | 429.2 | 32.7 | Inventive alloy |
| 6 | Ni—0.60Mg | ○ | 466.5 | 22.5 | Inventive alloy |
| 7 | Ni—0.72Mg | Δ | 514.5 | 20.4 | Inventive alloy |
| 8 | Ni—0.86Mg | Δ | 541.0 | 20.5 | Inventive alloy |
| 9 | Ni—1.11Mg | x | — | — | Comparative alloy |
| 10 | Ni—3.0Mg | xx | — | — | Comparative alloy |

(2) Manufacture of Clad Materials

Plate materials (each 2 mm in thickness and 30 mm in width) including a nickel plate made of pure Ni of Alloy No. 1 and alloy plates (each 2 mm in thickness and 30 mm in width) made of Ni—Mg alloys of Nos. 2 to 8 of Table 1 were prepared as former materials each of a bonding alloy layer, and plate materials (each 3 mm in thick and 30 mm in width) were also prepared as former materials each of a counterpart metal layer to be bonded to the bonding alloy layer. The combinations of the materials of the bonding alloy layer and the counterpart metal layer were as shown in Table 2. These plate materials in each combination were stacked on each other and were pressure-welded by cold rolling, and thereby each pressure-welded material having the thickness of 20 mm was acquired. The pressure-welded material was diffusion-bonded by diffusion annealing in a hydrogen gas atmosphere under a temperature condition shown in Table 2. Clad materials acquired in this manner were re-heated in a hydrogen gas atmosphere at 600° C. to simulate brazing of aluminum or 620° C. higher, as shown in Table 2. For each of Sample Nos. 1 to 8, the thickness of an intermetallic compound layer generated between the bonding alloy layer and the counterpart metal layer after the re-heating was measured with an electron microscope, so that each thickness was about 10 μm, for example.

(3) Peeling Test of Clad Materials

Figure 7:
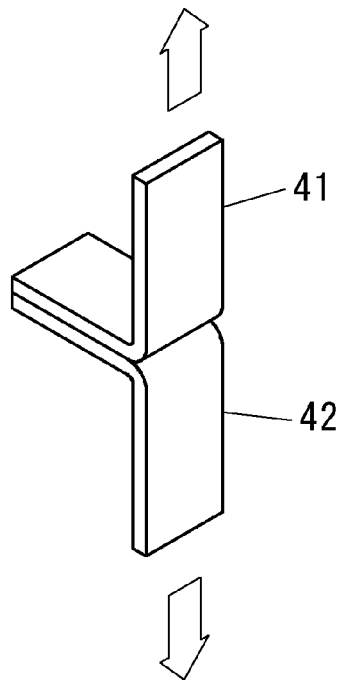
FIG. 7 is a diagram for explaining a procedure for measuring bonding strength of a clad material.

Two test pieces having a width of 10 mm and a length of 50 mm were collected from each of the clad materials diffusion-bonded and the clad materials additionally submitted to re-heating, and each bonding strength between the bonding alloy layer and the counterpart metal layer was checked in a peeling test. As shown in FIG. 7, the peeling test was executed by peeling off an end portion of the clad material, fixing the end portion of a bonding alloy layer 41 and that of a counterpart metal layer 42 each in a clamp of a tensile testing machine (from Shimadzu Corp., model: AG-10TB), pulling the clamped end portions in opposite directions, and measuring sequentially a load needed to peel off with the clamps moving. An average load (N) was measured for a moved stroke from 5 mm to 15 mm in which the load needed to peel off was stabilized, and the average load per unit width, namely, the bonding strength (N/mm) was calculated. The mean bonding strengths for each sample are also shown in Table 2. Samples that were not peeled off were each broken in the unfixed end portion peeled off first of the bonding alloy layer or the counterpart metal layer.

(4) Result of Test

From Table 2, it was recognized that each of the clad materials of Samples Nos. 4 to 9 of inventive examples, each of which the bonding alloy layer and the counterpart metal layer made of pure Al was bonded together, had a high bonding strength even after the re-heating, the bonding strength was about twice or more times as high as that of the case where the bonding alloy layer was made of pure Ni (Sample No. 1), and then the bonding strength was not decreased even by the heating at about 600° C., for example. It was also recognized that each bonding strength of Samples Nos. 11 and 12 of inventive examples, of which the bonding alloy layer and the counterpart metal layer made of pure Cu or a stainless steel (SUS304) was bonded together, was not substantially decreased by the re-heating.

TABLE 2

| Sample No. | Bonding alloy layer (A) Alloy No. | Counterpart metal layer (B) Material | Diffusion bonding Temperature/ Time ° C./min | Clad material Bonding strength N/mm | Re-heating Temperature/ Time ° C./min | Bonding strength after re-heating N/mm | Remarks |
|---|---|---|---|---|---|---|---|
| 1 | 1 (Pure Ni) | Pure Al | 550/3 | (Broken in B) | 600/15 | 2.4 | Comparative example |
| 2 | 2 (Mg: 0.021%) | " | " | " | " | 1.0 | Comparative example |
| 3 | 3 (Mg: 0.055%) | " | " | " | " | 2.6 | Comparative example |
| 4 | 4 (Mg: 0.10%) | " | " | " | " | 4.4 | Inventive example |
| 5 | 5 (Mg: 0.26%) | " | " | " | " | 5.8 | Inventive example |
| 6 | 6 (Mg: 0.60%) | " | " | " | " | 8.6 | Inventive example |
| 7 | 7 (Mg: 0.72%) | " | " | " | " | 12.5 | Inventive example |
| 8 | 8 (Mg: 0.86%) | " | " | " | " | 5.3 | Inventive example |

TABLE 2-continued

| Sample No. | Bonding alloy layer (A) Alloy No. | Counterpart metal layer (B) Material | Diffusion bonding Temperature/ Time ° C./min | Clad material Bonding strength N/mm | Re-heating Temperature/ Time ° C./min | Bonding strength after re-heating N/mm | Remarks |
|---|---|---|---|---|---|---|---|
| 9 | 6 | " | " | " | 620/15 | 35.2 | Inventive example |
| 11 | 6 | Pure Cu | 800/3 | 33.0 | " | 29.2 | Inventive example |
| 12 | 6 | SUS304 | " | (Broken in A) | " | (Broken in A) | Inventive example |

Example 2

(1) Manufacture of Brazing Composite Materials

Figure 8:
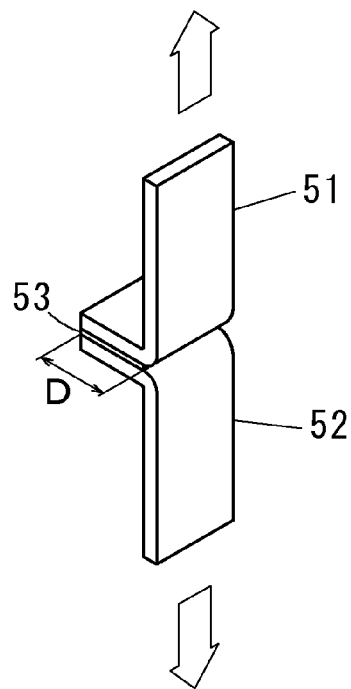
FIG. 8 is a diagram for explaining a procedure for measuring bonding strength of a brazing composite material.

The pure-Ni plate (2 mm in thickness) of Alloy No. 1 and the alloy plates (each 2 mm in thickness) of Alloys Nos. 4 to 6, which were manufactured in the Example 1, were each cold-rolled into a bonding alloy plate having a plate thickness of 1 mm. A test piece (10 mm in width and 50 mm in length) for brazing was collected each from the bonding alloy plates. On the other hand, as shown in Table 3, metal plates each having a plate thickness of 1 mm, which were made of pure Al, pure Cu, SUS304 (a stainless steel), or SPCC (cold-rolled steel plate), were prepared as counterpart metal plates, and test pieces each having the same width were collected from the metal plates. As shown in FIG. 8, a test piece 51 formed from the bonding alloy plate and a test piece 52 formed from the counterpart metal plate were each folded into an L-shape such that the brazing length D was 10 mm. A thin plate (0.5 mm in thickness) 53 made of the brazing material was sandwiched between the surfaces of the portions of the length D, and the sandwiched test pieces was heated in an oven at a temperature shown in Table 3. Thereby, a brazing composite material was manufactured. Two brazing composite materials were manufactured for each sample. In the brazing, "4004" under the JIS standard was used as a aluminum brazing material for Samples Nos. 21 to 24, and "BAg-8" silver solder under the JIS standard was used as a non-aluminum brazing material for Samples Nos. 25 to 27.

(2) Peeling Test of Brazing Composite Materials

For each of the brazing composite materials manufactured, similarly to Example 1, the average load from the start of the pulling to the time point at which the test piece brazed was completely peeled off was measured with the tensile testing machine. Based on the average loads, the mean bonding strength for each sample was calculated. The result is also shown in Table 3. Samples that were not peeled off were broken in the portion not brazed of the bonding alloy plate.

(3) Result of Test

From Table 3, it was recognized that each of Samples Nos. 22 to 24 of the inventive examples, which was produced by brazing the test piece formed from the pure Al plate to the test piece formed from the bonding alloy plate according to the present invention, had the bonding strength that was as three or more times as high as that of the sample (No. 21) of which the bonding alloy plate was formed from the pure Ni plate. It was also recognized that Samples Nos. 25 to 27 of the inventive examples, which were each produced by brazing the test piece formed from the non-aluminum metal plate such as a pure Cu plate to the test piece of the bonding alloy plate according to a preferred embodiment of the present invention, were each broken in the portion not brazed of the bonding alloy plate and thereby their brazing property had no problem.

TABLE 3

| Sample No. | Bonding alloy plate Alloy No. | Counterpart metal plate Material | Brazing temperature ° C. | Bonding strength N/mm | Remarks |
|---|---|---|---|---|---|
| 21 | 1 (Pure Ni) | Pure Al | 600 | 1.6 | Comparative example |
| 22 | 4 (Mg: 0.10%) | " | " | 9.7 | Inventive example |
| 23 | 5 (Mg: 0.26%) | " | " | 10.7 | Inventive example |
| 24 | 6 (Mg: 0.60%) | " | " | 5.2 | Inventive example |
| 25 | 6 | Pure Cu | 820 | (Broken) | Inventive example |
| 26 | 6 | SUS304 | " | " | Inventive example |
| 27 | 6 | SPCC | " | " | Inventive example |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A clad material comprising:
a non-aluminum metal layer made of any one non-aluminum metal selected from steel, copper, nickel, and titanium;
a bonding alloy layer made of an aluminum bonding alloy consisting essentially of 0.08 mass % or more and 0.90 mass % or less of Mg, and the balance of Ni; and
an aluminum layer made of pure aluminum or an aluminum alloy made of an Al—Mn-based alloy or Al—Mg-based alloy comprising 90 mass % or more of Al, wherein
the non-aluminum metal layer, the bonding alloy layer, and the aluminum layer are pressured-welded and diffusion-bonded to each other in this order so as to be bonded together.
2. The clad material according to claim 1, wherein the aluminum bonding alloy includes 0.10 mass % or more and 0.70 mass % or less of Mg.
3. The clad material according to claim 1, wherein
the non-aluminum metal layer is made of stainless steel, and
the aluminum layer is made of pure aluminum.

4. The clad material according to claim 3, wherein the aluminum bonding alloy includes 0.10 mass % or more and 0.70 mass % or less of Mg.

5. An aluminum bonding composite material comprising:
a clad material; and
an aluminum material made of aluminum; wherein
the clad material includes a non-aluminum metal layer made of any one non-aluminum metal selected from steel, copper, nickel and titanium, a bonding alloy layer made of an aluminum bonding alloy consisting essentially of 0.08 mass % or more and 0.90 mass % or less of Mg, and the balance of Ni, and an aluminum layer made of pure aluminum or an aluminum alloy made of an Al—Mn-based alloy or Al—Mg-based alloy comprising 90 mass % or more of Al, with the non-aluminum metal layer, the bonding alloy layer, and the aluminum layer being pressured-welded and diffusion-bonded to each other in this order so as to be bonded together; and
the aluminum material brazed to the aluminum layer of the clad material.

6. The aluminum bonding composite material according to claim 5, wherein the aluminum bonding alloy includes 0.10 mass % or more and 0.70 mass % or less of Mg.

7. The aluminum bonding composite material according to claim 5, wherein the non-aluminum metal layer is made of copper, and the aluminum material is an aluminum cooler to cool a semiconductor device.

8. The aluminum bonding composite material according to claim 7, wherein the aluminum bonding alloy includes 0.10 mass % or more and 0.70 mass % or less of Mg.

* * * * *